United States Patent [19]
Kline

[11] Patent Number: 6,139,932
[45] Date of Patent: Oct. 31, 2000

[54] LINERLESS LABEL WEB ROLL

[75] Inventor: James R. Kline, Dayton, Ohio

[73] Assignee: Monarch Marking Systems, Inc., Dayton, Ohio

[21] Appl. No.: 09/288,990

[22] Filed: Apr. 9, 1999

[51] Int. Cl.$^7$ ...................................................... B32B 3/10
[52] U.S. Cl. ........................ 428/41.8; 428/40.1; 428/42.3; 428/43
[58] Field of Search ........................ 428/40.1, 43, 41.8, 428/42.3; 283/81; 242/160.1

[56] References Cited

U.S. PATENT DOCUMENTS

| | | | |
|---|---|---|---|
| 3,892,901 | 7/1975 | Smith | 428/41 |
| 4,188,251 | 2/1980 | Grass | 156/248 |
| 5,487,915 | 1/1996 | Russ et al. | 427/208 |
| 5,536,546 | 7/1996 | Nash | 428/43 |
| 5,562,964 | 10/1996 | Jones | 428/43 |
| 5,833,377 | 11/1998 | Keller et al. | 400/208 |

*Primary Examiner*—Alexander S. Thomas
*Attorney, Agent, or Firm*—Joseph J. Grass

[57] ABSTRACT

There is disclosed a roll of a pressure sensitive adhesive-backed linerless label web with lines of perforation cuts comprised of alternating cuts and ties. The tie at each side margin of the web is weaker than the next adjacent tie to prevent winging up of tabs at the side margins of the web during unwinding of the roll and/or during feeding of the web through a printer, and yet the cuts in the side margins facilitate the initiation of tearing of labels from the web when desired but the weak ties are easy to tear manually and do not substantially impede such initiation of manually tearing.

5 Claims, 2 Drawing Sheets

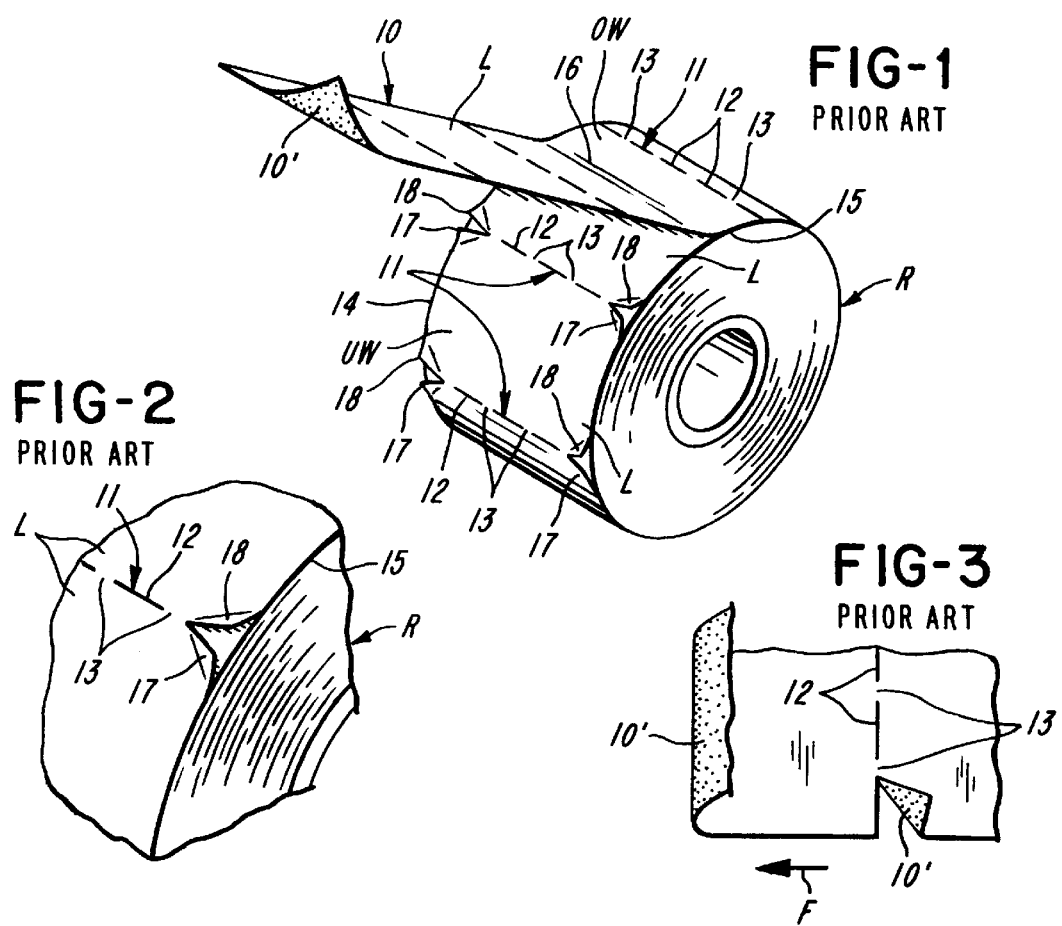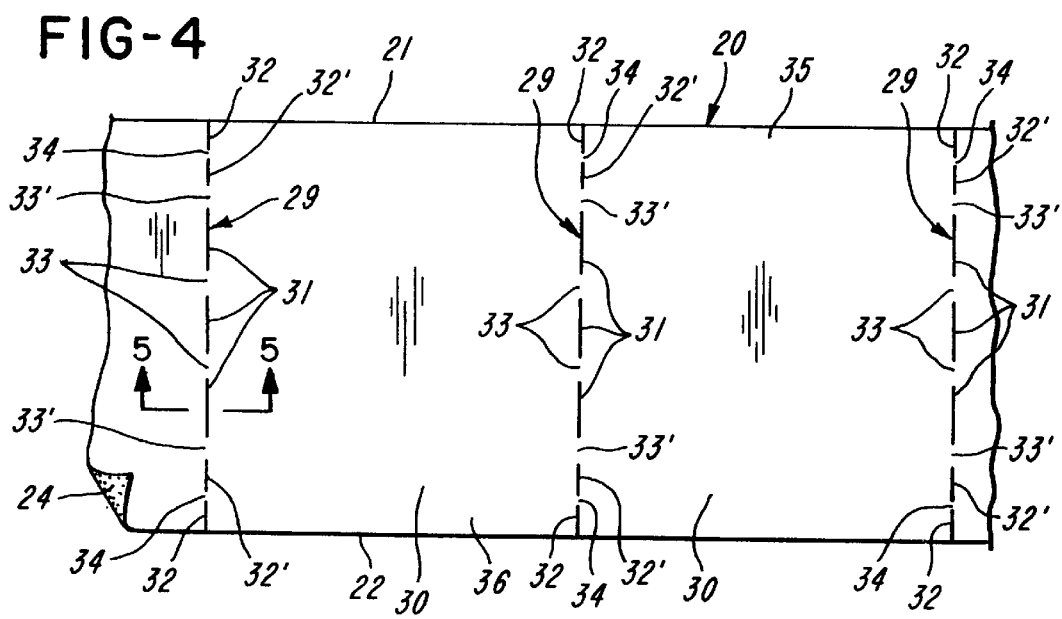

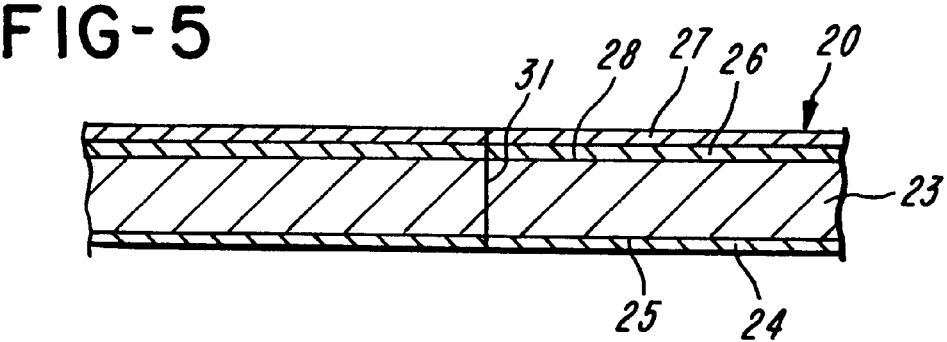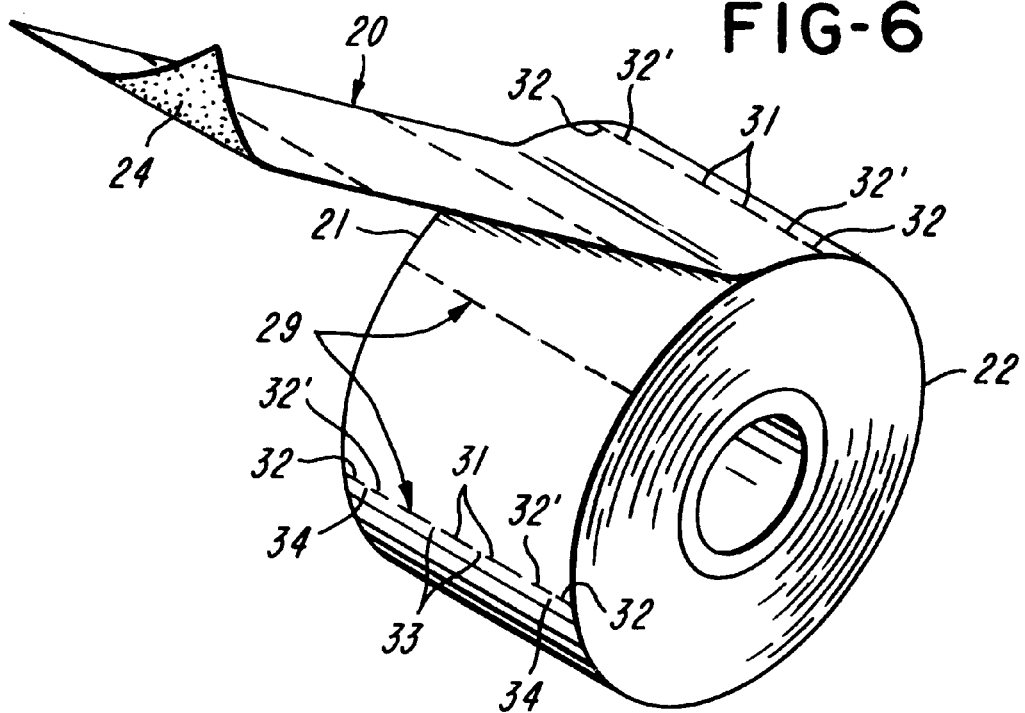

6,139,932

LINERLESS LABEL WEB ROLL

BACKGROUND OF THE INVENTION

1. Field of the invention

This invention relates to the art of linerless webs of pressure sensitive adhesive-backed labels.

2. Brief Description of the Invention

The following U.S. Pat. Nos. are made of record: 3,892,901; 4,188,251; 5,487,915; 5,536,546; and 5,833,377.

SUMMARY OF THE INVENTION

The purpose of the invention to provide an improved linerless web of pressure sensitive adhesive-backed labels.

It is a feature of the invention to overcome a problem associated with winging up of portions of side margins of a linerless web of adhesive-backed labels. When long lateral perforation cuts extend to the side edges of the adhesive-backed web, winging up of tabs at the side margins can occur while the web is being drawn off the label roll in a printer. This is because the pressure sensitive adhesive on one wrap on the roll can pull on and lift up tabs from the side margins of the next adjacent wrap. The tabs can potentially catch on parts of the printer as the web advances from the roll to the printhead and beyond. Winging up can also originate while the web is advancing through the printer. The invention helps prevent this problem, yet the web of the invention allows the user to readily start tearing the web at the line of perforation cuts.

BRIEF DESCRIPTION OF THE DRAWINGS

FIG. 1 is a perspective view of a prior art roll of linerless adhesive-backed labels showing winging up of tabs at side margins of the web;

FIG. 2 is an enlarged fragmentary view of a portion of the label roll of FIG. 1 showing one of the tabs;

FIG. 3 is a fragmentary top plan view of the web showing the leading flap or tab after being folded over out of the plane of the web;

FIG. 4 is a top plan view of a label web in accordance with the invention;

FIG. 5 is a sectional view taken along line 5—5 of FIG. 4; and

FIG. 6 is a perspective view of a roll of linerless label web also shown in FIGS. 4 and 5.

DETAILED DESCRIPTION OF THE PREFERRED EMBODIMENTS

With reference to FIGS. 1, 2 and 3, there is shown a prior art roll R of a linerless label web 10, like the one disclosed in U.S. Pat. No. 5,536,546 for use in a typical commercially available printer such as depicted in U.S. Pat. No. 5,833,377. Outer wrap OW is shown as being drawn off the roll R in FIG. 1. The roll R has longitudinally spaced lines of weakening 11 formed by perforation cuts which comprise cuts 12 preferably through the web 10 alternating with lands or ties 13. The lines of weakening 10 define connected labels L. The lines of weakening 11 include the cuts 12 which extend to side edges 14 and 15 of the web 10. Because two cuts 12 in each line of weakening 10 extend to the side edges 14 and 15, the start of manual tearing of labels L from the web 10 along the lines of weakening 10 is facilitated. As shown in FIG. 1, the outer wrap OW of the web 10 upstream (to the right in FIG. 1) of a line of delamination 16 is shown to be in tact. As the outer wrap OW is drawn from the roll R, the outer wrap OW can start to pull up portions of the side margins in the underlying wrap UW referred to as flaps or tabs 17 and 18. This can occur in spite of the fact that the side of the web 10 opposite the adhesive side has a release coating. This continues to occur as each successive underlying wrap UW is unwound. Such tabs 17 and 18 are shown on a larger scale in FIG. 2. The resulting tabs 18 which extend in a leading direction, that is, in the direction of feed F through the printer, can catch on edge guides and/or the printhead in the printer. The tabs 18 can be folded over flat by the printhead as shown in FIG. 3 which causes pressure sensitive adhesive 10' to stick the web to the printhead and/or the guides. This can result in paper feed failure. Also, the pressure sensitive adhesive can be smeared onto the printhead requiring cleaning of the printhead.

The longitudinal linerless web of the invention shown in FIGS. 4, 5, and 6 is generally indicated at 20. The web 20 is illustrated as having straight side edges 21 and 22, which is preferred because it is the lowest cost construction. The web 20 is shown to be comprised of a web of label material 23 having a coating of tacky or pressure sensitive adhesive 24 on one face 25 and a thermally responsive or thermal coating 26 on its other face 28. An invisible release coating 27 such as silicone is shown to cover the thermal coating 26.

Lines of weakening 29 extend transversely or laterally across the longitudinal web 20 at longitudinally and preferably equally spaced intervals. The lines of weakening 29 divide the web 20 into labels 30. The tacky adhesive 24 on the underside of the web 20 is preferably continuous and uniform and thus extends to the side edges 21 and 22.

The lines of weakening comprise cuts 31, 32 and 32' preferably through the web 20 and lands or ties 33, 33' and 34. Thus, lands and ties alternate. The ties 33, 33' and 34 are depicted as uncut portions of the web 20 which connect the labels 30 to each other, however, the labels 30 can be separated from each other as by manually tearing the web 20 along the lines of weakening 29. The cuts 32 extend to respective side edges 21 and 22 and to respective ties 34. The cuts 32' extend to respective ties 33' and 34. Each tie 33' is considered to be next adjacent to the respective tie 34. The ties 34 are adjacent to but spaced from the respective side edges 21 and 22. Each cut 31 which is adjacent to the tie 33' is considered to be a next adjacent cut because it is next adjacent to the respective cut 32'. The ties 33 and 33' are longer and stronger than the ties 34. The ties 34 serve to keep adjacent labels 30 connected to each other at side margins 35 and 36 but importantly they help keep tabs or portions of the side margins 35 and 36 from winging up as explained with reference to FIGS. 1, 2 and 3. The ties 34 are shown to be relatively close to respective side edges 21 and 22. The ties 34 are sufficiently close to the respective side edges 21 and 22 to help prevent winging up of tabs or flaps at the side margins 35 and 36. The ties 34 help keep the marginal sides 35 and 36 in the plane of the web 20. Yet the ties 34 are readily torn or severed when the user tries to tear one label 30 from the adjacent label 30. The average strength and the average length of the ties 33 and 33' is greater than the strength and length of the ties 34. While it is not necessary to have all the ties 33 and 33' be as strong and as long as illustrated, it is most preferable that the ties 33 be substantially longer and stronger than the ties 34. The cuts 32 and 32' makes it easy to manually start a tear when separating one label 30 from the adjacent label 30 and the ties 34 are short enough and/or weak enough to enable them to be readily torn, indeed, more readily torn than the ties 33 and 33'.

By way of example, not limitation, according to one specific embodiment of the invention, the cuts 31 are 0.070 inch in length, the cuts 32 and 32' are 0.0575 inch in length, the ties 33 are 0.031 inch in length, and the ties 34 are 0.010 inch in length.

Although each side margin 35 and 36 is illustrated as having only one weak tie 34, more than one such weak tie can be provided at each side margin 35 and 36. Therefore, reference to such a tie 34, as used in this specification and the appended claims means at least one tie 34 and that there can be a plurality of such ties, if desired.

Other embodiments and modifications of the invention will suggest themselves to those skilled in the art, and all such of these as come within the spirit of this invention are included within its scope as best defined by the appended claims.

What is claimed is:

1. A roll of linerless labels, comprising: a longitudinal web of label material having side margins terminating at side edges, the label material web having been wound into a roll, the label material web having one face with a continuous and uniform coating of pressure sensitive adhesive and another face with a release coating, wherein the roll has wraps, wherein the adhesive on each wrap adheres to the release coating on the underlying wrap, lines of weakening extending laterally across the label material web at longitudinally spaced intervals, wherein the lines of weakening include alternating cuts and ties, wherein each line of weakening includes at least two long ties and at least two short ties, wherein each line of weakening has a pair of spaced cuts at each side margin, wherein each pair of cuts includes one cut which extends to one of the side edges, wherein each pair of cuts is separated by a short tie that is readily torn when desired but which is sufficiently close to one of the side edges and sufficiently strong to help prevent its tearing and winging up of a portion of the side margin due to adherence of the adhesive on one wrap to the release coating on the underlying wrap while the web is being unwound from the roll, and wherein the short ties are shorter than the immediately adjacent long ties.

2. A roll as defined in claim 1, wherein the short ties are 0.01 inch in length.

3. A roll as defined in claim 1, wherein the long ties are 0.031 inch in length.

4. A roll as defined in claim 1, wherein each cut of each pair of spaced cuts is 0.0575 inch in length.

5. A roll as defined in claim 4, wherein the remaining cuts in each line of weakening are 0.07 inch in length.

\* \* \* \* \*